US006576738B2

(12) United States Patent
Braat et al.

(10) Patent No.: US 6,576,738 B2
(45) Date of Patent: Jun. 10, 2003

(54) POLY (ARYLENE ETHER) AND PROCESS FOR MAKING THE SAME

(75) Inventors: Adrianus J. F. M. Braat, Roosendaal (NL); Hugo G. E. Ingelbrecht, Essen (BE); Peter Alexander Knops, Papendrecht; Ruud Trion, Bergen op Zoom, both of (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,864

(22) Filed: Feb. 25, 2002

(65) Prior Publication Data

US 2002/0115822 A1 Aug. 22, 2002

Related U.S. Application Data

(62) Division of application No. 09/616,737, filed on Jul. 14, 2000, now Pat. No. 5,407,202.

(51) Int. Cl.[7] .............................................. C08G 65/00
(52) U.S. Cl. ..................... 528/86; 528/562 D; 528/491; 528/499; 528/582 R; 528/503
(58) Field of Search .............................. 528/86, 502 D, 528/491, 499, 502 R, 503

(56) References Cited

U.S. PATENT DOCUMENTS

| 3,234,994 A | 2/1966 | Dance ........................... 159/47 |
| 3,306,874 A | 2/1967 | Hay .............................. 260/47 |
| 3,306,875 A | 2/1967 | Hay .............................. 260/47 |
| 3,838,102 A | 9/1974 | Bennett et al. ................ 260/47 |
| 3,914,266 A | 10/1975 | Hay .......................... 260/438.1 |
| 4,028,341 A | 6/1977 | Hay .............................. 260/47 |
| 4,263,426 A | 4/1981 | Cooper et al. ............... 528/486 |
| 4,460,764 A | 7/1984 | Reffert et al. ................ 528/487 |
| 4,482,705 A | 11/1984 | Hambrecht et al. ......... 528/486 |
| 4,618,668 A | 10/1986 | Muench et al. .............. 528/215 |
| 4,654,418 A | 3/1987 | Berger et al. ................ 528/486 |
| 4,692,482 A | 9/1987 | Lohrengel .................... 523/340 |
| 4,696,996 A | 9/1987 | Brandt et al. ................ 528/214 |
| 4,751,268 A | 6/1988 | Taubitz et al. ............... 525/132 |

FOREIGN PATENT DOCUMENTS

| CA | 1063761 | 9/1975 |
| DE | 2640147 | 12/1980 |
| DE | 3233289 | 3/1984 |
| EP | 0 594 228 A2 | 6/1993 |
| FR | 2212363 | 12/1973 |
| WO | WO 99/32525 | 1/1999 |
| WO | WO 00/46273 | 8/2000 |
| WO | WO 00/46274 | 10/2000 |

OTHER PUBLICATIONS

International Search Report Dated Jul. 22, 2002.

*Primary Examiner*—Duc Truong

(57) ABSTRACT

A process for removal of a catalyst from a polymerization reaction mixture, comprises adding at least one polar solution to the reaction mixture to form a first at least two phase mixture, wherein one phase of the first at least two phase mixture is a first polymer phase; liquid/liquid centrifuging the first at least two phase mixture to separate the phases; removing the first polymer phase from the first at least two phase mixture; adding water to the first polymer phase to form a second at least two phase mixture, where one phase of the second at least two phase mixture is a second polymer phase; and separating the second polymer phase from the second at least two phase mixture.

23 Claims, No Drawings

POLY (ARYLENE ETHER) AND PROCESS FOR MAKING THE SAME

CROSS REFERENCE TO RELATED APPLICATION

This application is a division of U.S. application Ser. No. 09/616,737, filed Jul. 14, 2000 now U.S. Pat. No. 6,407,202.

BACKGROUND OF INVENTION

This disclosure relates to a method for making poly (arylene ether), and especially relates to a method for making substantially pure polyphenylene ether.

Poly(arylene ether) constitutes a large class of polymers which are employed pure or as blends in a wide variety of applications in the automotive, liquid handling and electronics industries. Poly(arylene ethers) are formed by reacting the monomer, either phenol or a substituted phenol, dissolved in an organic solvent, with oxygen in the presence of a catalyst. Copper-amine complexes are the most widely used catalysts for these reactions, although there are several other catalysts known in the art. Catalysts generally contain at least one heavy transition metal compound such as copper, manganese or cobalt compound, usually in combination with various other materials. Catalyst compounds can either be soluble in the reaction solvent or in solid form, i.e. supported on a solid substrate like silica, alumina or other insoluble support materials. Such catalysts are disclosed, for example, in U.S. Pat. Nos. 3,306,874, 3,306,875, 3,914,266 and 4,028,341 which are incorporated by reference herein.

The end point of the polymerization reaction is controlled by a number of methods known in the art such as in-line viscometry, molecular weight measurement, reaction run time, endgroup content, or oxygen concentration or oxygen consumption. When the end point is reached the polymerization reaction is stopped by halting addition of the oxygen reactant or removing the catalyst.

Several methods of catalyst removal are known in the art, most involving the use of an aqueous solution of a complexing agent. When the aqueous solution is added to the organic solution of the polymerization reaction two phases result. The complexing agent reacts with the catalyst and makes the resulting complex soluble in the aqueous phase (catalyst phase). The catalyst and poly(arylene ether) phases must then be separated and the poly(arylene ether) phase is carried on for isolation.

Good phase separation is essential to producing good quality poly(arylene ether). Without good phase separation the organic layer retains a significant amount of copper. Residual copper has an adverse affect on the properties of the polymer, with the sensitivity to oxidation and the inherent color particularly affected. Poly(arylene ether) oxidation causes black specs in most types of poly(arylene ether) processing such as extrusion and injection molding. German Patent Application No. 2,640,147 discloses improved phase separation through the use of an alcohol containing diluent. This method however has several disadvantages: the complexing reaction and the diluent addition require separate mixing units, a large amount of alcohol is required and the resulting copper containing solution is very dilute which complicates waste treatment. Other approaches to improved phase separation rely on anionic, cationic or non-ionic surfactants and de-emulgators. A de-emulgator is a substance that de-stabilizes an emulsion, allowing the resulting phases to be separated.

An alternate approach to catalyst removal, as disclosed in U.S. Pat. No. 4,654,418, involves a series of mixer-settler stages. The reaction mixture is combined with an aqueous complexing agent solution in a mixing stage, sent to a settler where the phases are separated and the process is repeated with additional aqueous complexing agent solution. The aqueous complexing agent solution is recycled from the second step to the first step, which improves the overall organic to aqueous phase ratio of 1.0:0.2–1.0:0.8, but increases the complexity of the apparatus. The resulting polyphenylene ether solution has a copper content less than 1 mg/kg and can be isolated using methods known in the art such as spray drying, steam precipitation, crumb formation with hot water, and multi stage devolatization.

Multistage devolatization is the most economically advantageous method of isolation because the isolation and extrusion are handled all in one step. However, there are numerable difficulties. The typically high solvent load to the extruder causes vent plugging and decreases operational stability. A low viscosity polymer, like polystyrene, is required to form a melt seal at the throat of the extruder to prevent toluene from being vented into the atmosphere. Thus the resulting poly(arylene ether) resins contain the low viscosity polymer which reduces the glass transition temperature and the viscosity of the final product. The poly (arylene ether)resin isolated by multistage devolatization frequently has high color and a high incidence of black specs. Good quality poly(arylene ether) resin has low color (a low yellowness index (YI)) and a low incidence of black specs. The color, as well as processing stability, can be improved by the addition of a thermal/oxidative stabilizer, such as hindered phenol or phosphites. Use of stabilizers increases the number of steps in the manufacturing process and the cost. Although multistage devolatization is economically advantageous it has not reached its full potential due to processing and color issues.

Accordingly, there remains a continuing need in the art for a method to produce substantially pure poly(arylene ether) with good processing stability, low color and a low incidence of black specs.

SUMMARY OF INVENTION

The above discussed drawbacks and deficiencies of the prior art are overcome or alleviated by an improved process for producing substantially pure poly(arylene ether) comprising: a.) a process for removing the catalyst from a poly(arylene ether) polymerization reaction comprising adding a polar liquid and centrifuging, and b.) isolating the poly(arylene ether) polymer from the reaction mixture without the addition of a low viscosity polymer other than poly(arylene ether). Isolation of the poly (arylene ether) polymer comprises an optional concentration step and a method of using a devolatizing extruder.

BRIEF DESCRIPTION OF DRAWINGS

NOT APPLICABLE

DETAILED DESCRIPTION

An improved process for producing substantially pure poly(arylene ether) comprises: a.) a process for removing the catalyst from a poly(arylene ether) polymerization reaction comprising adding a polar liquid and centrifuging, and b.) isolating the poly(arylene ether) polymer from the reaction mixture without the addition of a low viscosity polymer other than the poly(arylene ether) that is being isolated. Isolation of the poly(arylene ether) polymer comprises an optional concentration step and a method of using a devolatizing extruder.

The process of removing catalyst from a poly(arylene ether) polymerization reaction comprises: a) adding at least one polar solution to the reaction mixture to form a first at least two phase mixture, wherein one phase of said first at least two phase mixture is a polymer phase; b) liquid/liquid centrifuging said first at least two phase mixture to separate the phases; c) removing said polymer phase from said first at least two phase mixture; d) adding water to said polymer phase to form a second at least two phase mixture, where one phase of said second at least two phase mixture is a second polymer phase; e) separating said second polymer phase from said second at least two phase mixture.

Another embodiment is a process for isolating the poly (arylene ether) from the polymer phase. The isolation process can include a process for concentrating a mixture, comprising: heating the mixture at a first pressure; introducing the mixture to a vessel, wherein said vessel is at ambient temperature or cooled; and flashing the mixture to a second pressure lower than said first pressure and greater than atmospheric pressure. Either following the concentration step or immediately following catalyst removal, isolation can be completed in a devolatizing extruder.

Another embodiment is a method of utilizing a devolatizing extruder. Low molecular weight (low intrinsic viscosity) poly(arylene ether) is added to the intake feed of the extruder to form a melt seal. This is in contrast to the prior art practice of using low molecular weight polymers other than poly(arylene ether) such as polystyrene.

Poly(arylene ether)s are known polymers comprising a plurality of structural units of the formula (I):

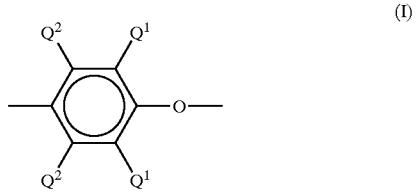

(I)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly (aryiene ether) in which coupling agents such as low molecular weight polycarbonates, quinones, heterocycles and formals undergo reaction in known manner with the hydroxy groups of two poly(arylene ether) chains to produce a higher molecular weight polymer and also included are all chemically modified poly(arylene ethers) such as endgroup modified or grafting modified polymers. Poly(arylene ether)s further include combinations of any of the above.

Poly(arylene ether) is formed from precursors, typically monomers, such as 2,6-dimethylphenol, 2,3,6-trimethylphenol, orthocresol or any other substituted or unsubstituted phenols. It will be apparent to those skilled in the art from the foregoing that the poly(arylene ether) contemplated for use include all those presently known, irrespective of variations in structural units or ancillary chemical features.

Formation of poly(arylene ether) by a polymerization reaction is carried out by the continuous addition of oxygen to a reaction mixture containing a solvent, the chosen monomer or monomers, and a catalyst. The oxygen can be supplied via any oxygen source, such as air, pure oxygen gas or any other oxidative species.

The catalyst can comprise any conventional catalyst capable of facilitating polymerization and formation of the poly(arylene ether), with transition metal complexes typically employed. Typically the transition metal comprises copper, manganese or cobalt, with copper preferred. Such catalysts are disclosed, for example, in U.S. Pat. Nos. 3,306,874, 3,306,875, 3,914,266 and 4,028,341 which are incorporated by reference herein. Copper-amine complexes are especially preferred and are formed in situ from a copper salt solution, preferably cuprous bromide, and an amine mixture, typically of secondary and tertiary amines, and preferably dibutylethyleneamine, dibutylamine, dimethylbutylamine, a quaternary ammonium salt, mixtures comprising at least one of the foregoing amines, and others.

When the monomer or monomers have been polymerized to the desired degree, preferably a solids concentration greater than about 20%, and more preferably greater than about 22%, as determined by any known method in the art, the catalyst is removed from the mixture.

Removal of the catalyst is achieved by a combination of the introduction of a polar liquid to the mixture to form multiple phases, and performing liquid-liquid centrifuging. When the polar liquid is added to a poly(arylene ether) reaction solution, the copper-amine catalyst becomes inactivated, halting further oxidation. The polar liquid can be water, a solution of a complexing reagent, also known as a chelating agent, or a combination thereof. Many diverse complexing agents may be used, such as sulfuric acid, acetic acid, ammonium salts, bisulfate salts, and the like, as well as mixtures comprising at least one of the foregoing complexing agents, with those disclosed in U.S. Pat. No. 3,838,102 to Bennett et al, which is herein incorporated by reference, preferred. Some preferred complexing agents include polyfunctional carboxylic acid containing compounds such as, for example, sodium potassium tartrate, nitrilotriacetic acid (NTA), citric acid, glycine, and the like with polyalkyle nepolyamine polycarboxylic acids, am i nopolycarboxylic acids, aminocarboxylic acids, aminopolycarboxylic acids, aminocarboxylic acids, polycarboxylic acids and their alkali metal, alkaline earth metal or mixed alkali metal-alkaline earth metal salts, and the like, preferred. Other preferred agents include hydroxyethylenediaminetriacetic acid, diethylenetriaminepentaacetic acid and their salts; and ethylenediaminotetraacetic acid (EDTA) and a mono-, di-, tri- or tetrasodium salts thereof. Also useful are combinations comprising at least one of any of the above complexing agents. The complexing endgroup to copper catalyst molar ratio is preferably about 1:1 or higher. The complexing endgroup is that part of the complexing agent which reacts directly with the catalyst.

The multiphases are preferably mixed and allowed to reach equilibrium (e.g., for up to about 70 min.) at a temperature which facilitates separation of the phases and removal of the catalyst. Although room temperature (e.g., about 25° C.) is acceptable, heating the phases up to about 50° C. or greater is preferred. Importantly, the temperature preferably is below the boiling point of the components. Prior to feeding to the centrifuge, water may be added to the mixture. Separation of the phases is then facilitated with a liquid/liquid centrifuge. The centrifuging step can be repeated until the desired removal is attained. Useful centrifuges include both batch and continuous centrifuges, with continuous centrifuges preferred.

For example, a solution of nitrilotriacetic acid is added to the catalyst-poly(arylene ether) mixture. The mixture is heated to about 55° C., equilibrated for 70 minutes and liquid/liquid (L/L) centrifuged in a continuous centrifuge at about 4,500 rpm. The aqueous catalyst phase is drawn off and the separated organic poly(arylene ether) solution phase, preferably mixed with water, is fed to a second continuous liquid/liquid centrifuge operating at about 6,000 rpm. Again, the polymer phase is removed. The combination of using the liquid/liquid centrifuge with a polar liquid unexpectedly resulted in a polymer phase containing less than about 5 per million (ppm) catalyst, typically less than about 2 ppm catalyst, and preferably less than about 1.1 ppm catalyst. It was further discovered that, in contrast to conventional catalyst removal techniques, multiple introductions of the chelating agent was not necessary to obtain such high catalyst removal from the polymer phase. Catalyst removal to less than about 1.1 ppm could be obtained using a first centrifuging with a chelating agent and a second centrifuging with water, preferably distilled water.

The polymer phase, after catalyst removal, can be concentrated so as to increase the solids content of the polymer phase and reduce the solvent load to the devolatizing extruder thereby improving extruder performance. Concentration comprises preheating the polymer phase to a temperature so that the sensible heat content of the polymer phase is sufficient to supply the needed latent heat for the evaporation of the organic solvent at a pressure sufficiently high to prevent flashing in the heat exchanger or lines before the flash valve and flash vessel. Sensible heat of the polymer phase is the thermal energy supplied to the polymer solution to increase the temperature of the phase; this is in contrast to heat needed for evaporating the solvent, which is called the latent heat of vaporization. Both forms of heat or energy add up to the total heat content of the polymer phase. Once the polymer phase has attained the desired temperature and pressure, it is flashed to a lower pressure without heating the flash vessel. The pressure in the flash vessel determines the corresponding solvent vapor/liquid (V/L) equilibrium temperature. The temperature difference before and after the flash vessel determines the total amount of solvent evaporated and hence the residual poly(arylene ether) concentration of the flashed solution. Typically the pressure of the flash vessel is chosen such that there is a slight overpressure in the vessel, preferably from about 1.05 bar to about 1.4 bar, in order to limit the risk of air leakage from outside the flash vessel.

In a preferred embodiment, the polymer phase is concentrated to obtain a target solid poly(arylene ether) content. Preferably the target solid poly(arylene ether) content is about 55% to about 75% and more preferably from about 65% to about 75%. The temperature of the polymer phase prior to flashing is preferably about 235° C. to about 255° C. and more preferably from about 240° C. to about 250° C. The pressure of the polymer phase prior to flashing is preferably from about 35 bar to about 45 bar and more preferably from about 40 to about 45 bar. Optionally, the mixture resulting from the initial concentration step can be directed to a buffer tank and the concentration step repeated to increase the percentage of solids.

Conventionally flash vessels are heated and a lubricant (which reduces the purity of the final polymer), such as a low molecular wax, is added to the polymer phase to prevent sticking of the flashed concentrate to the vessel wall. It was unexpectedly discovered that the lubricant is not necessary if the flash vessel is unheated or even cooled and the pressure of the flash vessel is maintained at slightly above atmospheric pressure, preferably from about 1.05 bar to about 1.4 bar.

Isolation is preferably performed in a devolatizing extruder although other methods such as wiped film or thin film evaporators are acceptable. The polymer phase may be isolated after catalyst removal and concentration or directly after catalyst removal. Preferably, the devolatizing extruder comprises co-rotating intermeshing screws, an intake zone, a back-feed capability, a sufficient amount of devolatizing venting sections (e.g., preferably more than 2, with about 4 or more especially preferred) and a solution feed between at least two of the venting sections. A feed between the first and second venting sections is especially preferred. The screw, preferably operating at a speed between about 250 rpm and about 300 rpm, moves the polymer through the extruder via transport elements which are preferably self wiping. The devolatizing extruder more preferably comprises an intake zone comprising a feed port, kneading section and vacuum vent, followed by a solution feed port and three vacuum vents with kneading sections in between. The devolatizing extruder is capable of heating to temperatures greater than about 300° C. and is capable of maintaining different temperatures and pressures in different sections of the extruder.

In a preferred embodiment, about 0.1 weight percent (wt %) to about 10 wt % low molecular weight poly(arylene ether), in pellet form, is added at the intake zone of the devolatizing extruder. The low molecular weight poly(arylene ether) preferably has an intrinsic viscosity of about 0.09 dl/g to about 0.1 6 dl/g. The low molecular weight poly(arylene ether) forms a melt seal which inhibits the solvent from being vented into the atmosphere and prevents sticking in the first zones of the extruder without reducing the purity of the poly(arylene ether). The low molecular weight poly(arylene ether) is melted, compounded, and degassed. The polymer phase is then added, preferably after concentration, and the polymer phase is intimately mixed with the low molecular weight poly(arylene ether) and solvent removed via incremental increases in temperature and incremental decreases in pressure. The temperature of the extruder is about 240° C. to about 300° C. The minimum pressure is as low as can be reasonably attained, preferably about 0.1 bar to about 0.4 bar. The operating conditions of the devolatizing extruder are readily determined without undue experimentation by one of ordinary skill in the art.

The combination of incremental temperature increases combined with incremental pressure decreases are commonly known as multi-stage devolatization. Unexpectedly the combination of concentration followed by multi-stage devolatization yields polymer with a very low solvent content, typically less than about 1,000 ppm, with less than about 800 ppm preferred, and less than about 600 ppm especially preferred.

The resulting polymer may be handled by any method known in the art, such as die face pelletization, flaking, strand pelletization, "vibrating drop" pelletization, sheet forming, web forming, as well as other conventional methods. Preferably, the extruded polymer is underwater pelletized. Drying of the pellets to low moisture contents can be conveniently carried out in several ways known in the art, including a centrifugal dryer, batch or continuous oven dryers, fluid bed dryers, and the like.

In another preferred embodiment the polymer phase is concentrated to a solids content of about 55% to about 75% and further isolated in a devolatizing extruder. In another embodiment, the polymer phase is flashed either partly or totally into the extruder. The polymer phase is heated to a temperature about 230° C. to about 260° C., preferably about 235° C. to about 255° C., and even more preferably about 240° C. to about 250° C. at a pressure of about 30 bar to about 50 bar, preferably about 35 bar to about 45 bar, and even more preferably about 40 bar to about 45 bar, prior to introduction to the extruder. Upon introduction to the extruder the pressure change, typically at least about 30 bar, flashes the polymer phase, increasing the solids content to about 55% or greater.

The invention is further illustrated by the following non-limiting example.

EXAMPLE

The resulting product was evaluated for black specs by VIR (Visual Inspection Rating) copper content by atomic absorption spectroscopy and for color by the Yellowness Index. The Visual Inspection Rating method is a physical count of the number of black specs in the final granules. The VIR was substantially reduced from a rating of normally 20–40 to a rating of 1. Yellowness Index is determined by dissolving 0.3 grams of poly(arylene ether) in 50 milliliters of toluene. The transmission of light through the solution is measured at 445 nanometers (nm), 555 nm and 600 nm. The Yellow Index is then calculated using the following formula:

$$\text{Yellowness Index} = \frac{(\text{transmisson at 600 nm}) - (\text{transmisson at 445 nm})}{(\text{transmisson at 555 nm})} \times 100$$

The following example was used to produce substantially pure poly(arylene ether): 500 kg of 2,6 xylenol was dissolved in 21,440 kg of toluene in a reaction vessel. 55 kg of cuprous bromide in 48% HBr aqueous solution, 11 kg of dibutylethylenediamine, 3 kg of quaternary ammonium salt in 29 kg toluene and 60 kg of dibutylamine were added to the xylenol solution. The reaction was conducted in a semi-batch way with the continuous addition of 2,6 xylenol over a period of 45 minutes at a rate of 140 kg/min and oxygen at an initial rate of about 570 Nm$^3$/hr. The rate of oxygen addition was based on oxygen concentration control. End point of the reaction was reached when an in-line viscosity reading of 48 ml/g was attained. 34 liters of 40% nitriloacetic acid (aq) was added to the reaction mixture. The resulting multiphase solution was mixed for 70 minutes at 55° C. and then added to the first continuous liquid/liquid centrifuge at a feedrate of 10 m$^3$/hr; Water was added to the first centrifuge at a feedrate of about 0.1 m$^3$/hr.

After separation in the centrifuge, the organic polymer solution phase was added to a second continuous liquid/liquid centrifuge at the rate of 0.7 m$^3$/hr; with water added at the rate of 0.1–0.15 m$^3$/hr. The separated polymer phase was then heated to greater than 240° C. at a pressure of 40 bar and flashed to a lower pressure, about 1.2 bar. The polymer phase was then added to the solution feedport of the extruder at a rate of 150 kg/hr. 17 kg of low molecular weight polyphenylene ether with an intrinsic viscosity of 0.10–0.14 dl/g was added at the intake zone of the extruder.

The extruder was operated with the temperature and pressure profile show below:

| | |
|---|---|
| T zone 1 | 270–275° C. |
| T zone 2 | 255–260° C. |
| T zone 3 | ca. 250° C. |
| T zone 4 | 250–260° C. |
| T zone 5 | 270–280° C. |
| T zone 6 | about 275° C. |
| T zone 7 | 290–300° C. |
| T zone 8 | 280–290° C. |
| T zone 9 | about 300° C. |
| P back vent | about 0.8 bar |
| P 1st vacuum vent | 0.7–0.8 bar |
| P 2nd vacuum vent | 0.4–0.5 bar |
| P 3rd vacuum vent | 0.1–0.4 bar |
| Screw rpm | 250–300 |

The isolated polymer was then processed by underwater pelletization.

The copper content of the example poly(arylene ether) was 1.1 ppm based on the poly(arylene ether) weight. Poly(arylene ether) produced in the example had a Yellowness Index of 20, a marked improvement compared to a Yellowness Index of 50–60 as is typically seen in poly (arylene ether) resin. The VIR rating of the example polymer is 1 compares favorably with the typical VIR rating of 20–40 for poly(arylene ether) produced conventionally. The purity of the poly(arylene ether), 99.9%, greatly exceeds the 95% purity typically seen in the art.

There are several advantages to the current methods over the prior art, most notably the production of substantially pure poly(arylene ether) with low color and low incidence of black specs. Color and the quantity of black specs are an important quality of the isolated poly(arylene ether) because subsequent use of the product. Polymers with low color and low incidence of black specs can be tinted or pigmented more effectively. These polymers will show a better surface finish after moulding, less light scattering in clear applications and will have better processing properties in extrusion equipment with narrow dies like foam extruders.

In the prior art poly(arylene ethers) typically contains notable amounts of other polymers such as polystyrene which are employed as lubricant in the isolation process. The presence of other polymers such as polystyrene alters the characteristics of the resulting product. Since the product of the present invention is substantially pure, it retains all of the advantageous properties of poly(arylene ether).

The current methods achieve a higher quality product through several novel modifications. The catalyst removal process is greatly improved resulting in a more complete removal of the metal component with the added advantage of utilizing only small amounts of water or water and a solution of chelating agent. The virtually complete catalyst removal directly impacts on color and black spec quantity.

Also, the concentration step does not require the use of a lubricant, which increases the overall purity of the resulting product and does not require heating of the flash vessel which is less expensive and more energy efficient. The utilization of the extruder with the self wiping transport elements, especially when followed by underwater pelletization, coupled with the use of low molecular weight polyphenylene ether as a vent seal allows the production of high purity poly(arylene ether) with good color, low quantity of black specs and very low copper content.

While preferred embodiments have been shown and described, various modifications and substitutions may be made thereto without departing from the spirit and scope of the invention. Accordingly, it is to be understood that the present invention has been described by way of illustration and not limitations.

What is claimed is:

1. A process for removal of a catalyst from a polymerization reaction mixture, comprising:
   a. adding at least one polar solution to the reaction mixture to form a first at least two phase mixture, wherein one phase of said first at least two phase mixture is a first polymer phase;
   b. liquid/liquid centrifuging said first at least two phase mixture to separate the phases;
   c. removing said first polymer phase from said first at least two phase mixture;
   d. adding water to said first polymer phase to form a second at least two phase mixture, where one phase of said second at least two phase mixture is a second polymer phase; and
   e. separating said second polymer phase from said second at least two phase mixture at a temperature below the boiling points of the phases.

2. The process of claim 1, wherein said polar solution is a solution of a complexing agent.

3. The process of claim 2, wherein said complexing agent is a polyfunctional carboxylic acid containing compound.

4. The process of claim 2, wherein said complexing agent is selected from the group consisting of citric acid; polyalkylenepolyamine polycarboxylic acid; sulfuric acid; acetic acid; aminopolycarboxylic acid; aminocarboxylic acid; a polycarboxylic acid; an alkali metal salt, alkaline earth metal salt or mixed alkali metal-alkaline earth metal salt of a polycarboxylic acid; nitrilotriacetic acid; ethylenediaminetetraacetic acid; hydroxyethylenediaminetriacetic acid; diethylenetriaminepentaacetic acid; an alkali metal salt of ethylenadieminetetracetic acid; sodium potassium tartrate; glycine; sulfuric acid; acetic acid; ammonium salt; bisulfate salts; and a mixture comprising at least one of the foregoing complexing agents.

5. The process of claim 4, wherein said complexing agent is nitriloacetic acid.

6. The process of claim 2, wherein said complexing agent has at least one complexing endgroup and further wherein the complexing endgroup to catalyst molar ratio is at least about 1:1.

7. The process of claim 1, further comprising using liquid/liquid centrifugation to separate said second polymer phase from said second at least two phase mixture.

8. The process of claim 1, wherein the catalyst content of said second polymer phase is less than about 5 ppm.

9. The process of claim 8, wherein the catalyst content of said second polymer phase is less than about 2 ppm.

10. The process of claim 9, wherein the catalyst content of said second polymer phase is less than about 1.1 ppm.

11. The process of claim 1, further comprising heating the first at least two phase mixture to greater than about 50° C. and less than the boiling point of the components of the first at least two phase mixture.

12. The process of claim 1, wherein the reaction mixture comprises poly(arylene ether).

13. The process of claim 1, wherein the catalyst is a copper-amine complex.

14. A process for removal of a catalyst from a polymerization reaction mixture and concentrating a resulting polymer phase, comprising:
   a. adding at least one polar solution to the reaction mixture to form a first at least two phases mixture, wherein one phase of said first at least two phase mixture is a first polymer phase;
   b. liquid/liquid centrifuging said first at least two phase mixture to separate the phases;
   c. removing said first polymer phase from said first at least two phase mixture;
   d. adding water to said first polymer phase to form a second at least two phase mixture, where one phase of said second at least two phase mixture is a second polymer phase;
   e. separating said second polymer phase from said second at least two phase mixture at a temperature below the boiling points of the phases,,
   f. heating the second polymer phase at a first pressure;
   g. introducing the second polymer phase to a vessel, wherein said vessel is at ambient temperature or cooled; and
   h. flashing the second polymer phase to a second presure lower than said first pressure and greater than atmospheric pressure.

15. The process of claim 14, wherein the mixture is heated to about 235° C. to about 255° C.

16. The process of claim 15, wherein the mixture is heated to about 240° C. to about 250° C.

17. The process of claim 14, wherein the first pressure is about 35 bar to about 45 bar.

18. The process of claim 17, wherein the first pressure is about 40 bar to about 45 bar.

19. The process of claim 14, wherein the second pressure is about 1.05 bar to about 1.4 bar.

20. The process of claim 14, further comprising concentrating said mixture to a desired solids content of about 55% to about 75%.

21. The process of claim 20, further comprising using a buffer tank to achieve a solids content of about 65% to about 75%.

22. The process of claim 14, wherein the reaction mixture comprises poly (arylene ether).

23. The process of claim 14, wherein the catalyst is a copper-amine complex.

* * * * *